United States Patent [19]
Neumann et al.

[11] 3,859,902
[45] Jan. 14, 1975

[54] POUR IN COFFEE MAKER

[75] Inventors: Charles G. Neumann, Palatine; Leroy Peterson, Hoffman Estates, both of Ill.

[73] Assignee: Reynolds Products Inc., Schaumburg, Ill.

[22] Filed: June 28, 1973

[21] Appl. No.: 374,375

[52] U.S. Cl. ................................................ 99/304
[51] Int. Cl. ............................................. A47j 31/54
[58] Field of Search ............ 99/295, 304, 306, 307, 99/300, 302, 283

[56] References Cited
UNITED STATES PATENTS
| | | | |
|---|---|---|---|
| 3,371,593 | 3/1968 | Price | 99/307 |
| 3,479,949 | 11/1969 | Reynolds | 99/295 |
| 3,490,356 | 1/1970 | Peterson | 99/295 |

*Primary Examiner*—Robert W. Jenkins
*Attorney, Agent, or Firm*—Shenier & O'Connor

[57] ABSTRACT

An improved coffee maker of the pour in type in which an outlet hot water pipe of relatively large diameter extends upwardly from a readily removable spray head assembly in the bottom of the hot water supply tank to a location slightly above the standby water level of the tank removably to receive a siphon head comprising a lower portion extending into the outlet pipe and, in cooperation with the wall of the outlet pipe, forming inlet passages having an aggregate area appreciably less than that of the outlet pipe passage, an inverted siphon cup providing communication between the hot water tank and the inlet passages and an upper portion extending above the maximum water level of the tank and formed with a passage communicating with a bore extending through cup and through the lower portion to provide an air vent for the interior of the hot water supply pipe.

19 Claims, 5 Drawing Figures

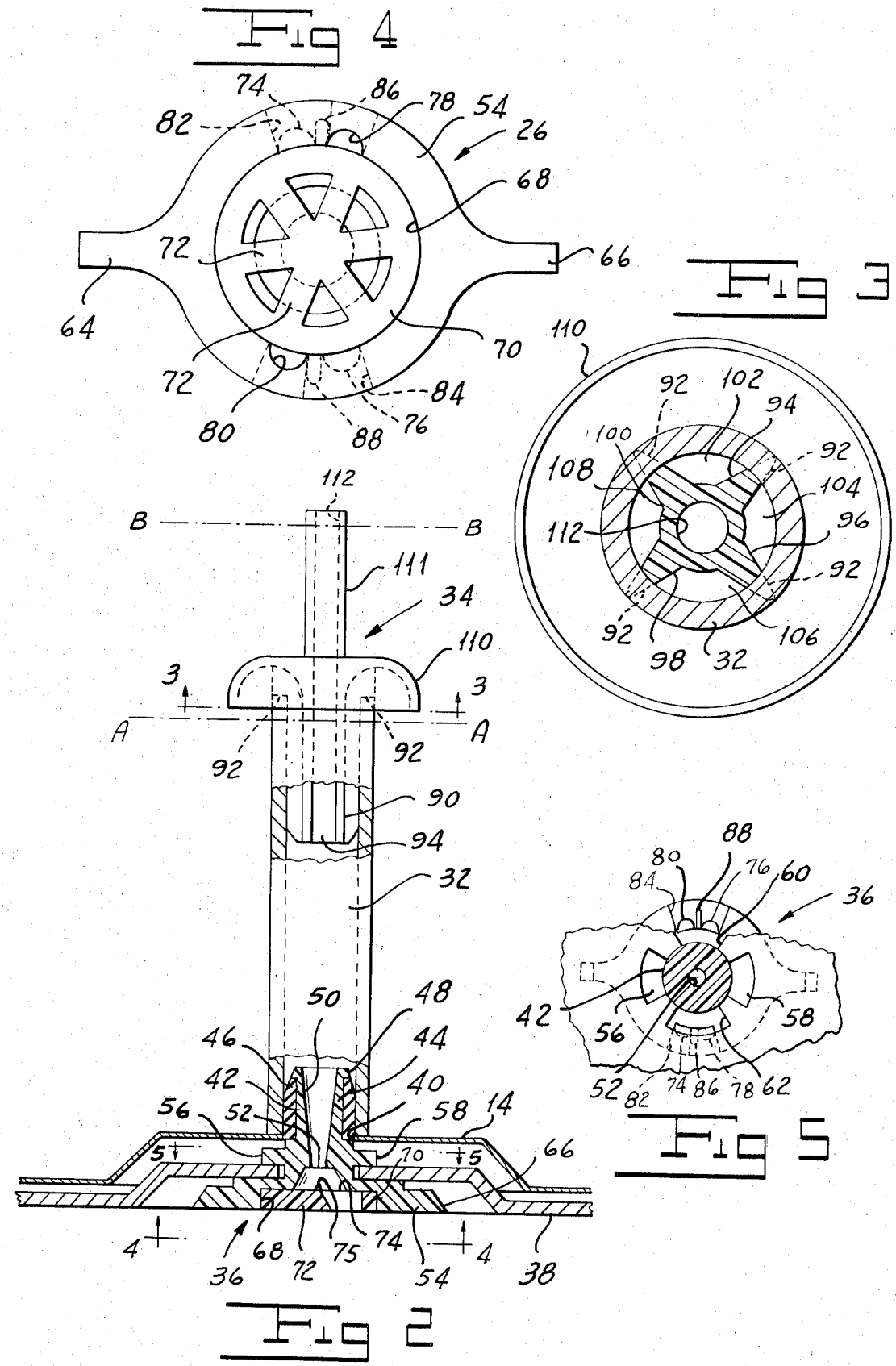

POUR IN COFFEE MAKER

BACKGROUND OF THE INVENTION

There are known in the prior art coffee brewers for brewing coffee a carafe at a time in which a hot water reservoir is adapted to receive a charge of cold water adjacent to the bottom of the reservoir whereat the heater is located. The charge of cold water which is equal to the volume of coffee to be brewed displaces a volume of hot water upwardly in the tank. The upwardly displaced hot water is fed outwardly to a spray head which distributes the water over ground coffee contained in a brewing basket. As the hot water flows through the ground coffee, the coffee is brewed and flows outwardly through a centrally located outlet in the brewing basket to a carafe positioned to receive the brewed coffee.

One of the difficulties encountered in use of brewers of the type described above is cleaning the various parts of deposits formed as the water is heated. Not only must the deposits themselves be removed from the parts but the flakes dislodged from deposits on the heating element or the like tend to collect in small openings through which the water must pass and clog the same. This problem is aggravated by the fact that in order for the coffee properly to be brewed, hot water must be fed by the spray head at a relatively slow rate. Consequently, spray heads of the prior art are provided with relatively small openings and the hot water discharge pipe is of a relatively small diameter. In addition, coffee makers of the type described generally are provided with siphoning arrangements at the inlet to the hot water discharge pipe in order to prevent dripping through the pipe as the cold water expands upon being heated when the apparatus is in standby condition. These siphoning arrangements add to the difficulty of cleaning the coffee brewer.

We have invented an improved coffee brewer of the pour in type which overcomes the defects of coffee brewers of the prior art. Our improved coffee brewer is more easily cleaned than are coffee brewers of the type known in the art. Our improved coffee brewer is relatively simple in construction for the result achieved thereby.

SUMMARY OF THE INVENTION

One object of our invention is to provide an improved coffee brewer of the pour in type which overcomes the defects of coffee brewers of the prior art.

Another object of our invention is to provide an improved pour in coffee brewer which is more easily cleaned than are pour in coffee brewers of the prior art.

A further object of our invention is to provide an improved pour in coffee brewer which is relatively simple in construction for the result achieved thereby.

Other and further objects of our invention will appear from the following description.

In general our invention contemplates the provision of an improved coffee brewer of the pour in type in which the upper end of a hot water outlet pipe located in the hot water reservoir removably receives a siphon head including a lower portion received in the pipe and so constructed as to cooperate with the pipe wall to form a plurality of inlet passages having an aggregate area which is appreciably less than the cross sectional area of the outlet pipe, an intermediate portion forming an inverted siphon cup which provides communication between the interior of the tank and the inlet passages and having an upwardly extending portion providing a continuation of a bore through the lower and intermediate portions to a point above the maximum water level of the tank. The lower end of the outlet pipe is connected to a readily disassembled spray head assembly manually removably mounted in the bottom of the hot water tank.

BRIEF DESCRIPTION OF THE DRAWINGS

In the accompanying drawings which form part of the instant specification and which are to be read in conjunction therewith and in which like reference numerals are used to indicate like parts in the various views:

FIG. 2 is a fragmentary sectional view of the hot water outlet system of our improved pour in coffee brewer with parts broken away and with other parts shown in section.

FIG. 3 is a sectional view of the outlet system illustrated in FIG. 2 taken along the line 3—3 of FIG. 2 and drawn on an enlarged scale.

FIG. 4 is a bottom plan view of the outlet system illustrated in FIG. 2 taken along the line 4—4 of FIG. 2 and drawn on an enlarged scale.

FIG. 5 is a sectional view of the outlet system shown in FIG. 2 taken along the line 5—5 of FIG. 2.

DESCRIPTION OF THE PREFERRED EMBODIMENT

Figure 1:
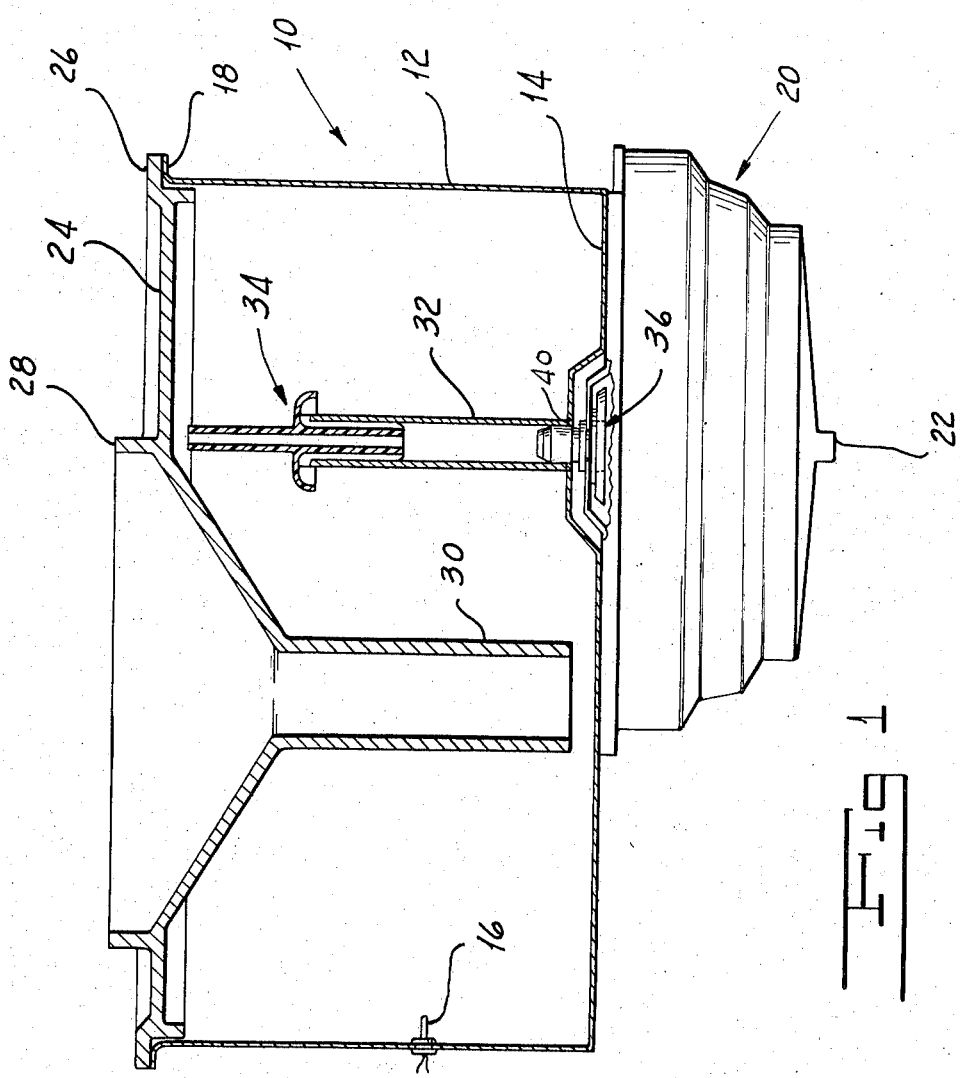
FIG. 1 is a sectional view of the hot water supply system of our improved pour in coffee brewer.

Referring now to the drawings, the hot water supply system indicated generally by the reference character 10 of our improved pour in coffee brewer includes a tank 12 having a bottom 14. A heater inlet 16 supplies current to a suitable heating unit located adjacent to the bottom 14. We provide the upper edge of the tank 12 with a peripheral flange 18. The system 10 is adapted to spray hot water over ground coffee contained in a brewing basket indicated generally by the reference character 20. As is known in the art, as the hot water flows through the coffee grounds coffee is brewed and is discharged through an outlet 22 of basket 20 into a suitable carafe (not shown).

A cover plate 24 is provided with a peripheral flange 26 adapted to be received by the flange 18 to position the cover on top of the tank 12. Cover 24 may be formed with a funnel 28 adapted to receive a charge of cold water and to feed the cold water to the tank 12 adjacent to the bottom thereof through a pipe 30.

Our improved brewer includes a hot water outlet pipe 32 adapted to receive a siphon head indicated generally by the reference character 34 at the upper end thereof and to conduct hot water to a spray head assembly indicated generally by the reference character 36 mounted in the lower end of the pipe which, in turn, is manually removably attached to a partition 38 of the coffee maker in a manner to be described. The bottom 14 is provided with an opening 40 around which the lower end of pipe 32 is secured by brazing or soldering or the like.

Referring now to FIGS. 2, 4 and 5, the spray head assembly 36 includes a nozzle 42 formed with a neck 44 for receiving a seal 46 adapted to engage the interior of pipe 32 when the assembly 36 is in place. A lip 48 retains seal 46 on neck 44. We form neck 44 with a tapered inlet passage 50 leading to the outlet orifice 52 of the nozzle. We provide neck 44 with a pair of locking lugs 56 and 58 above the base 54 of the nozzle 42. Lugs 56 and 58 are adapted to be inserted through openings 60 and 62 in partition 38 to permit the assembly to be turned to lock it in place with seal 46 engaging the inside of tube 32. We may provide base 54 with a pair of lateral extensions 64 and 66 to facilitate this operation.

A recess 68 in the underside of base 54 communicating with orifice 52 is adapted removably to receive a wheel like spray deflector 70 having a plurality of radially extending spokes 72 the upper edges of which are knife edges 74 extending from a central projection 75 adapted to receive the stream of water from orifice 52 and to spray hot water over the ground coffee in basket 20. We provide the upper periphery of deflector 70 with a pair of circumferentially spaced ears 74 and 76 adapted to pass through openings 78 and 80 at the periphery of recess 68 and into locking recesses 82 and 84 at the upper periphery of recess 68. After the deflector 70 has thus been inserted in recess 68, it is rotated approximately 30° to move ears 74 and 76 over locking bosses 86 and 88 in the bases of recesses 82 and 84. The deflector is thus readily manually removably assembled in position. While the spray head 36 differs structurally from the spray discharge head shown in U.S. Pat. No. 3,490,356, it functions in substantially the same manner as the spray head described therein.

Our siphon head 34 includes a lower portion 90 extending downwardly from shoulders 92 which receive the upper edge of the tube 32 to position the siphon head 34 on the pipe 32. We form the lower portion 58 of the siphon head 34 with a plurality of generally axially extending grooves 94, 96, 98 and 100, spaced around the periphery of the portion 58. When the siphon head 34 is in position on the pipe 32, the grooves cooperate with the wall of the pipe 32 to form a plurality of passages 102, 104, 106 and 108. As will more fully be explained hereinbelow, we form the grooves 94, 96, 98 and 100 to provide passages 102, 104, 106 and 108 having an aggregate area which is appreciably less than the cross sectional area of the pipe 32.

We form the intermediate portion of the siphon head 34 with an inverted siphon cup 110, the lip of which is positioned just below the shoulder 92 when the head 34 is assembled on pipe 32. The upper portion of the siphon head 34 is a pipe 111 extending upwardly from the cup 78 to a location above the maximum water level of the tank 12 which is indicated by the dot-dash line B—B in FIG. 2. We form the siphon head 34 with a passage 112 extending from the bottom to the top of the head so as to form an air vent.

In assembling the parts of our hot water supply system, the pipe 32 first is secured over opening 38. Deflector 70 is placed in recess 68 so that ears 74 and 76 pass through openings 78 and 80 and enter recesses 82 and 84. The deflector 70 then is rotated approximately 30° to move ears 74 and 76 over bosses 86 and 88 releasably to lock the deflector in place. Seal 46 is slipped over lip 48 and onto the neck 44 to complete assembly 36. Next the assembly is placed on the machine by inserting lugs 56 and 58 through openings 60 and 62 and rotating the assembly to the locked position. Finally the siphon cup 34 is placed on the top of pipe 32. For cleaning the order of assembly described above is reversed, all operations being accomplished manually.

In operation of a coffee maker incorporating our hot water supply system, the level of water within the tank in the standby condition is just below the lower edge of the siphon cup 110 as indicated by the dot dash line A—A in FIG. 2. When a fresh batch of coffee is to be brewed a carafe of cold water is poured into the funnel 28 and is fed by the pipe 30 to the bottom of the tank 12 whereat the heater is located. As the cold water flows into the tank, hot water is displaced upwardly to a level above the level of the siphon cup 110. Hot water thus displaced upwardly flows through passages 102, 104, 106 and 108 and into the outlet pipe 32. The rate at which water flows out of the pipe 32 is governed by the size of orifice 56. This narrow stream of water impinges on the projection 75 and is directed by knife edges 74 of the spokes or ribs 72 so as to be sprayed over the charge of ground coffee in the brewing basket 20. As is known in the art, this water flows through the ground coffee and coffee brewed is discharged through opening 22 into the carafe. It is to be noted that the annular area between the lip of cup 110 and the outer surface of pipe 32 and the aggregate passage entry area between the upper edge of pipe 32 and the cup 110 and the aggregate area of passages 68, 70, 72 and 74 are progressively smaller thus ensuring proper siphon action. The last of the hot water fed from the tank to the pipe 32 is under this siphon action. The passage 82 leading from the inside of the pipe 32 to the space above the maximum water level of the tank 12 vents any air trapped in the relatively large pipe 32 to prevent blockage of flow through the pipe.

When it is desired to clean the parts of the apparatus the siphon head 34 and the spray head can readily be removed in the manner described and cleaning of the parts thereof and of the relatively large diameter pipe 32 is an easy task.

It will be seen that we have accomplished the objects of our invention. We have provided an improved pour in type coffee brewer. Our improved brewer overcomes the defects of brewers of the prior art. It is relatively easy to clean as compared with brewers of the prior art. It is relatively simple in construction for the result achieved thereby.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Have thus described our invention, what we claim is:

1. In a coffee maker for making coffee by the batch, a hot water supply system including in combination, a hot water tank having a bottom formed with an outlet opening, a pipe in said tank extending upwardly from said opening for an appreciable distance to a predetermined level in said tank, a siphon forming member having an inlet, means manually removably mounting said siphon forming member on said pipe with said inlet adjacent to the upper end of said pipe, a heater in said tank, and means for introducing cold water into said tank adjacent to the bottom thereof.

2. A hot water supply system as in claim 1 in which said siphon forming member comprises an inverted siphon cup having a lip extending around the upper end of said pipe in spaced relation thereto.

3. A hot water supply system as in claim 1 in which said siphon-forming member comprises a portion extending downwardly into said pipe from the upper end thereof, said downwardly extending portion forming a passage with the wall of said pipe.

4. A hot water supply system as in claim 1 in which said siphon-forming member is formed with an air vent passage extending from the interior of said pipe to a location above the maximum water level of said tank.

5. A hot water supply system as in claim 1 in which said siphon-forming member comprises means forming a passage having an entry opening downwardly into said tank and an exit opening into said pipe.

6. A hot water supply system as in claim 5 in which the cross sectional area of said exit is less than the cross sectional area of said entry.

7. A hot water supply system as in claim 1 in which said siphon-forming member comprises an inverted siphon cup the lip of which extends around the upper end of said pipe and in spaced relation thereto to form a passage entry and a portion extending downwardly into said pipe from the upper end thereof, said downwardly extending portion being formed with a plurality of circumferentially spaced axially extending grooves cooperating with the wall of said pipe to form a plurality of continuations of said passage, said continuations leading into the interior of said pipe.

8. A hot water supply system as in claim 7 in which the aggregate cross sectional area of said passage continuations is less than the cross sectional area of said passage entry.

9. A hot water supply system as in claim 8 in which said siphon-forming member comprises an upper portion extending upwardly from said siphon cup to a location above the maximum water level of said tank, said member being formed with a passage extending through said lower portion and said cup and said upper portion to provide an air vent for the inside of said pipe.

10. A hot water supply system as in claim 9 in which said siphon-forming member is formed with a shoulder adapted to rest on the upper edge of said pipe to support said member in assembled position on said pipe.

11. A hot water supply system as in claim 1 including a spray head assembly readily removably assembled to the lower end of said pipe.

12. A hot water supply system as in claim 11 in which said spray head comprises a nozzle having a neck extending upwardly into said pipe and means in said neck forming a restricted opening for the flow of water out of said pipe and means providing a plurality of radially extending knife edges below said restricted opening to receive a stream of water flowing outwardly from said pipe through said restricted opening.

13. A hot water supply system as in claim 12 in which said nozzle is formed with a recess below said restricted opening and in which said knife edge forming means comprises a wheel like element and means for readily removably mounting said element in said recess.

14. A hot water supply system as in claim 13 including a plate positioned below said lower end of said pipe, said plate formed with an opening for receiving said spray head assembly, said plate opening being formed with a pair of radial extensions and in which said assembly comprises a pair of spaced lugs adapted to pass through said extensions.

15. In a hot water supply system for a coffee maker having a hot water outlet pipe, a siphon-forming member comprising a lower portion adapted to be received in said pipe, an intermediate inverted siphon cup having a lip extending around and located in spaced relationship to said lower portion and an upper portion extending upwardly from said cup, said lower portion formed with a plurality of circumferentially spaced axially extending grooves leading from the lower end of said member into said cup, said member being formed with an internal air vent passage extending from the lower end thereof to the upper end thereof.

16. A siphon-forming member as in claim 15 including a shoulder on the periphery of said member for engaging said pipe.

17. A hot water supply system as in claim 15 in which said spray head assembly comprises a nozzle neck extending into the lower end of said tube forming an opening appreciably smaller than the cross-sectional area of said pipe for controlling the flow of water out of said pipe and distributor located below said opening forming a plurality of radially extending knife edges for receiving water flowing out of said pipe through said smaller opening.

18. A hot water supply system as in claim 15 in which the aggregate area of said passage continuations is smaller than the area of said passage entry.

19. In a coffee maker, a hot water supply system including in combination, a hot water supply tank having a bottom formed with an outlet opening, an outlet pipe extending upwardly from a lower end at said opening to an upper end located at a predetermined level in said tank, a siphon cup comprising a lower portion adapted to be received in said pipe at the upper end thereof and to extend downwardly into said pipe, an intermediate inverted siphon cup having a lip extending around and in spaced relation to said pipe adjacent to the upper end thereof to form a siphon passage entry, said lower portion being formed with a plurality of circumferentially spaced axially extending peripheral grooves forming with the wall of said pipe a plurality of siphon passage continuations leading from said cup to the interior of said pipe below said member, and an upper portion extending upwardly from said cup to a location in said tank above the maximum water level thereof, said member being formed with a passage extending from the lower end of said member to the upper end thereof to provide an air vent for said pipe, a spray head assembly, and means for readily releasably securing said spray head assembly over the lower end of said pipe.

* * * * *